United States Patent

[11] 3,579,078

[72] Inventors: Donald L. Cronin, Anaheim; Bertrand F. Fraber, Palos Verdes Peninsula; Charles R. Nockey, Canoga Park, Calif.
[21] Appl. No.: 864,067
[22] Filed: Oct. 6, 1969
[45] Patented: May 18, 1971
[73] Assignee: TRW Inc., Redondo Beach, Calif.

[54] CONSTANT CURRENT HIGH VOLTAGE POWER SUPPLY
1 Claim, 2 Drawing Figs.

[52] U.S. Cl. ................................................ 321/2, 307/60, 307/98, 323/6
[51] Int. Cl. ........................................... H02m 3/32, H02j 1/04
[50] Field of Search .................................. 323/4, 6, 16, 75 (E); 321/2, 16; 307/60, 72, 73, 75, 98, 106; 331/113.1

[56] References Cited
UNITED STATES PATENTS

| | | | |
|---|---|---|---|
| 3,295,043 | 12/1966 | Massey | 321/2 |
| 3,299,370 | 1/1967 | Massey | 331/113 |
| 3,400,319 | 9/1968 | Stich | 321/2 |
| 3,435,320 | 3/1969 | Lee et al. | 321/2 |

Primary Examiner—James D. Trammell
Assistant Examiner—G. Goldberg
Attorneys—Daniel T. Anderson, Harry I. Jacobs and Gerald Singer

ABSTRACT: A direct current DC source and a square wave voltage source are applied to a bridge type switching amplifier. The output of the amplifier is applied to the primary of a step up transformer, and the secondary of the transformer is connected to a voltage quadrupler. The output of the voltage quadrupler is the desired DC voltage output.

Patented May 18, 1971 3,579,078

INVENTORS
Donald L. Cronin
Bertrand F. Farber
Charles R. Nockey

BY *Harry J. Smith*

ATTORNEY

CONSTANT CURRENT HIGH VOLTAGE POWER SUPPLY

BACKGROUND OF THE INVENTION

High voltage power supplies designed for low output power levels tend to be disproportionately large for the amount of power typically produced. In space applications, where size and weight are generally at a premium, small, compact, high voltage power supplies are needed.

In certain applications, a variable voltage of 20—80 volts DC must be converted to a DC level of 2—8000 volts. Square wave alternating current at 1000 cycles is also available. One method of implementing the desired result is using the combination of an inverter, a single transformer to step the voltage up from 80 volts to 8000 volts, and a rectifier. This method is disadvantageous in that a relatively heavy transformer is needed to handle the magnetic flux load. Using multiple transformers with their primaries connected in parallel and their secondaries connected in series eliminates some weight problem, however, it creates insulation problems as well as creating excessive interlayer capacity on the high voltage secondary windings. Weight and size is also increased due to the insulation problem.

SUMMARY

According to the present invention, what is basically a pulse transformer is used in conjunction with a voltage quadrupler circuit. A single step up transformer with a one to 25 turns ratio receives voltage from a bridge type switching amplifier wherein 20 to 80 volts DC is applied to one side of the bridge, and one thousand cycle square wave alternating current is applied as a drive signal input. The output of the bridge drives a step up transformer which, in turn, drives a voltage quadrupler circuit. Since the voltage quadrupler circuit is a peak charging device, the drive to the transformer primary need only be narrow voltage pulses of the desired amplitude. Although a one to 25 step up ratio is used in the transformer, the total number of turns needed to handle the requisite flux is reduced as a result of the pulsed input. Because less turns are needed, a minimum number of single layer windings can be used resulting in a compact unit.

DESCRIPTION OF THE PREFERRED EMBODIMENTS

Figure 1:
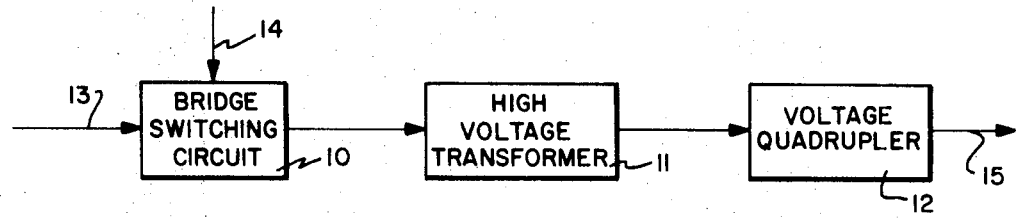
FIG. 1 is a block diagram of a preferred embodiment of the invention.

FIG. 1 shows a block diagram of a preferred embodiment of the invention. Bridge switching circuit 10 receives 20—80 volts DC through input 14 and approximately 1,000 hertz square wave alternating current through input 13. The output of bridge switching circuit 10 is a series of voltage pulses.

The output of bridge switching circuit 10 is fed to a high voltage transformer 11. High voltage transformer 11 is a step up transformer having a one to 25 turns ratio. The windings of transformer 11 are preferably single layer. Single layer windings are made feasible since the input is a series of alternating voltage pulses, and the number of windings necessary to sustain the requisite flux is lower than if a full 1,000 hertz square wave were applied to the primary.

The output of transformer 11 is connected to a voltage quadrupler 12. Voltage quadrupler 12 is a peak charging device which converts the voltage appearing at the secondary of transformer 11 to a DC level of about four times that applied. Output is at 15.

Figure 2:
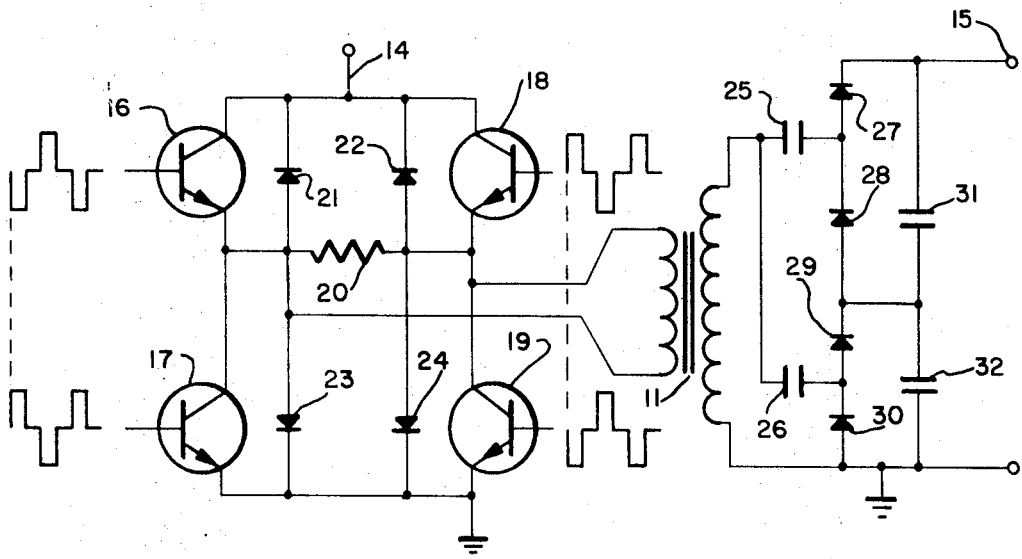
FIG. 2 is a schematic diagram of the block diagram of FIG. 1.

FIG. 2 shows a schematic diagram of one embodiment of the present invention. Bridge switching circuit 10 includes transistors 16, 17, 18 and 19; diodes 21, 22, 23 and 24 and resistor 20. The emitter of transistor 16 is connected to the collector of transistor 17. The emitter of transistor 18 is connected to the collector of transistor 19. The collectors of transistors 16 and 18 are tied together and receive DC via input 14. The emitters of transistors 17 and 19 are tied together and grounded. The anodes and cathodes of diodes 21 and 22 are connected across the emitters and collectors of transistors 16 and 18 respectively. The cathodes and anodes of diodes 23 and 24 are connected across the emitters and collectors of diodes 17 and 19 respectively. Output resistor 20 is coupled across the emitters of transistors 16 and 18.

In operation, a pulse-width modulated (PWM) square wave is coupled into the base of transistor 16. A second PWM square wave, 180° out of phase with respect to the first PWM square wave, is coupled into the base of transistor 18. A third PWM square wave identical to the second PWM square wave is coupled to the base of the transistor 17. A fourth PWM square wave identical to the first PWM square wave is coupled to the base of transistor 19.

The primary of transformer 11 is connected across output resistor 20.

Voltage quadrupler 12 is connected across the secondary of transformer 11. One side of the secondary is grounded. The other side of the secondary is connected to the junction of capacitors 25 and 26. Diodes 27, 28, 29 and 30 are connected in series and the anode of diode 30 is grounded. The other side of capacitor 26 is connected to the junction of diodes 29 and 30. The other side of capacitor 25 is connected to the junction of diodes 27 and 28. The series combination of capacitors 31 and 32 is shunted from the cathode of diode 27 to ground. The junction of capacitors 31 and 32 is coupled to the junction of diodes 28 and 29.

The direct current output 15 is taken across the series combination of capacitors 31 and 32. Output 15 is about 8,000 volts DC for a maximum input at 14 of about 80 volts DC. Thus about a one to 100 step up is achieved without the need for a heavy one to 100 step up transformer.

We claim:

1. A constant current high voltage power supply comprising:
   an input;
   a first transistor having a collector emitter and base, the collector coupled to the input, and the base adapted to receive a first pulse-width modulated square wave;
   a second transistor having a collector emitter and base; the collector coupled to the input, and the base adapted to receive a second pulse-width modulated square wave 180° out of phase with respect to the first pulse-width modulated square wave;
   a first resistor connecting the emitter of the first transistor to the emitter of the second transistor;
   a first diode coupled across the emitter and collector of the first transistor;
   the anode connected to the emitter of said first transistor;
   a second diode coupled across the emitter and collector of the second transistor;
   the anode connected to the emitter of said second transistor;
   a third transistor having a collector emitter and base;
   the collector coupled to the emitter of the first transistor;
   the emitter coupled to ground; and
   the base adapted to receive a third pulse-width modulated square wave identical to the second square waVe;
   a fourth transistor having an emitter base and collector;
   the collector coupled to the emitter of the second transistor;
   the emitter connected to ground; and
   the base adapted to receive a fourth pulse-width modulated square wave identical to the first square wave;
   a third diode coupled across the emitter and collector of the third transistor;
   the anode connected to the collector of the third transistor;
   a fourth diode coupled across the emitter and collector of the fourth transistor;

the anode connected to the collector of the fourth transistor;

a step-up transformer;
- the primary terminals shunted across the first resistor; and
- the secondary terminals connected respectively to ground and to one terminal of a first capacitor and one terminal of a second capacitor;

an output terminal;

a fifth diode connected between the other terminal of the first capacitor and the output terminal;
- the anode connected to the other terminal of the first capacitor;

a third capacitor and a fourth capacitor connected in series and shunted across the output terminal and ground;

a sixth diode connected across the anode of the fifth diode and the juncture of the third and fourth capacitors;
- the cathode connected to the anode of the fifth diode;

a seventh diode connected across the anode of the sixth diode and the other terminal of the second capacitor;
- the cathode connected to the anode of the sixth diode; and an eighth diode connected across the anode of the seventh diode and ground;
- the cathode connected to the anode of the seventh diode.